US011113466B1

(12) United States Patent
Hira et al.

(10) Patent No.: US 11,113,466 B1
(45) Date of Patent: Sep. 7, 2021

(54) GENERATING SENTIMENT ANALYSIS OF CONTENT

(71) Applicant: INTUIT INC., Mountain View, CA (US)

(72) Inventors: Harpreet Singh Hira, Frisco, TX (US); Abhay Dhundiraju Sastry, Plano, TX (US); Priyadarshini Rajendran, Little Elm, TX (US); Sanmathi Sathyanarayana Naga, Dallas, TX (US); Tak Yiu Daniel Li, Frisco, TX (US); Majo Paulose, Plano, TX (US); Jasen Paul Stine, Frisco, TX (US); Darpan Sharma, McKinney, TX (US); Nicholas Allen McHenry, Plano, TX (US)

(73) Assignee: INTUIT, INC., Mountain View, CA (US)

( * ) Notice: Subject to any disclaimer, the term of this patent is extended or adjusted under 35 U.S.C. 154(b) by 251 days.

(21) Appl. No.: 16/288,967

(22) Filed: Feb. 28, 2019

(51) Int. Cl.
    *G06F 40/216* (2020.01)
    *H04N 21/2187* (2011.01)
    *G06F 40/242* (2020.01)
    *G06F 40/289* (2020.01)
    *G06F 40/20* (2020.01)
    *G06F 40/30* (2020.01)

(52) U.S. Cl.
    CPC ............ *G06F 40/216* (2020.01); *G06F 40/20* (2020.01); *G06F 40/242* (2020.01); *G06F 40/289* (2020.01); *G06F 40/30* (2020.01); *H04N 21/2187* (2013.01)

(58) Field of Classification Search
    CPC ...... G06F 40/30; G06F 40/284; G06F 40/242; G06F 40/20
    See application file for complete search history.

(56) References Cited

U.S. PATENT DOCUMENTS

| 2002/0107712 | A1* | 8/2002 | Lam ..................... G06Q 10/063 705/7.11 |
| 2006/0200342 | A1* | 9/2006 | Corston-Oliver ..... G06F 40/253 704/10 |
| 2007/0067405 | A1* | 3/2007 | Eliovson ................ G06Q 10/10 709/206 |
| 2008/0133488 | A1* | 6/2008 | Bandaru ............... G06F 16/951 |
| 2012/0290908 | A1* | 11/2012 | Kumar .................. G06F 16/972 715/205 |

(Continued)

*Primary Examiner* — Samuel G Neway
(74) *Attorney, Agent, or Firm* — Patterson + Sheridan LLP

(57) ABSTRACT

Certain aspects of the present disclosure provide techniques for providing sentiment analysis of content. In order to determine the overall sentiment of content, a request is received by a sentiment analyzer, which then identifies a content identification number and retrieves comments associated with the content identification number. The sentiment analyzer pre-processes the comments, which includes removing all personal identifying information from the comments. The sentiment analyzer sends the pre-processed comments to a natural language processing service, and in turn, receives sentiment indications corresponding to the comments provided. Based on the sentiment scores, the sentiment analyzer generates a sentiment analysis and displays the sentiment analysis in the graphical user interface generated by the sentiment analyzer.

20 Claims, 5 Drawing Sheets

(56) References Cited

U.S. PATENT DOCUMENTS

| | | | |
|---|---|---|---|
| 2012/0317049 A1* | 12/2012 | Hao | G06Q 10/00 |
| | | | 705/347 |
| 2013/0124653 A1* | 5/2013 | Vick | H04L 51/32 |
| | | | 709/206 |
| 2013/0185175 A1* | 7/2013 | Roozen | G06Q 30/0629 |
| | | | 705/26.64 |
| 2014/0379379 A1* | 12/2014 | Janevski | G16H 50/20 |
| | | | 705/3 |
| 2015/0347590 A1* | 12/2015 | Kamotsky | G06F 16/9535 |
| | | | 707/723 |
| 2018/0260860 A1* | 9/2018 | Devanathan | G06F 40/30 |
| 2019/0155832 A1* | 5/2019 | Kuznetsov | G06F 16/48 |
| 2019/0361987 A1* | 11/2019 | Qiao | G06F 16/345 |
| 2020/0159838 A1* | 5/2020 | Kikin-Gil | G06F 3/167 |
| 2020/0211067 A1* | 7/2020 | Rasansky | G16H 10/60 |

* cited by examiner

GENERATING SENTIMENT ANALYSIS OF CONTENT

INTRODUCTION

Aspects of the present disclosure relate to a method and system of generating a sentiment analysis of content based on comments. In particular, embodiments of the present disclosure relate to identifying a set of comments associated with a content item and mapping sentiment indications from a natural language processing service to pre-defined sentiment categories to generate a sentiment analysis of the content to display in a graphical user interface.

BACKGROUND

Content creators develop a variety of different types of content for consumption by viewers including video, audio, and documents. At the same time, content creators can request feedback from viewers of the content in order to determine any issues in the content that need to be addressed, what viewers like and dislike about the content, and how the content can be improved. For example, viewers can view a video created to explain how to use a specific feature of a software application. In the comments, the viewers can indicate the video quality is "grainy" and that it is difficult to hear what is being said in the video.

However, a number of limitations hinder content creators from adjusting content based on comments from viewers. For example, a content creator often does not have direct access to comments from viewers. In such cases, the content creator may need to submit a request for such comments. This request can take time to process and can be further delayed if comments from multiple content items are stored together. Even if the content creator does have direct access to comments (or receives comments based on the request), the number of comments can be overwhelming, preventing the content creator from getting a clear picture of what viewer sentiment is of the content.

Further, content creators are not the only party interested in knowing what viewers think about content items. For example, a content creator is creating content items (e.g., videos) for an organization as part of a series directed to instructing viewers how to use different features of a product (e.g., software application, electronic device, etc.). In such an example, there are others within the organization, such as those associated with accounting, administration, and marketing, that may wish to know how viewers are responding to the content in order to determine whether to further continue the series and how to promote marketing for the series. The other parties can face the same limitations as the content creators in determining what viewer sentiment is of content.

Therefore, a solution is needed to provide not just content creators but interested parties with a sentiment analysis of viewer comments regarding presented content.

BRIEF SUMMARY

Certain embodiments provide a method for providing a graphical user interface to manage a sentiment analysis of content. The method generally includes receiving a request for a sentiment analysis of content, wherein the request includes a content ID corresponding to the content. The method further includes retrieving a set of comments corresponding to the content ID. The method further includes providing the set of comments to a natural language processing service. The method further includes receiving, from the natural language processing service, a set of sentiment indications, wherein each respective sentiment indication of the set of sentiment indications is associated with a respective comment of the set of comments. The method further includes generating the sentiment analysis based on the set of sentiment indications. The method further includes displaying the sentiment analysis in a window in a graphical user interface.

Other embodiments provide systems configured to perform methods for providing a graphical user interface to manage a sentiment analysis of content, such as the aforementioned method, as well as non-transitory computer-readable storage mediums comprising instructions that, when executed by a processor of a processing system, cause the processing system to perform methods for providing a graphical user interface to manage a sentiment analysis of content.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
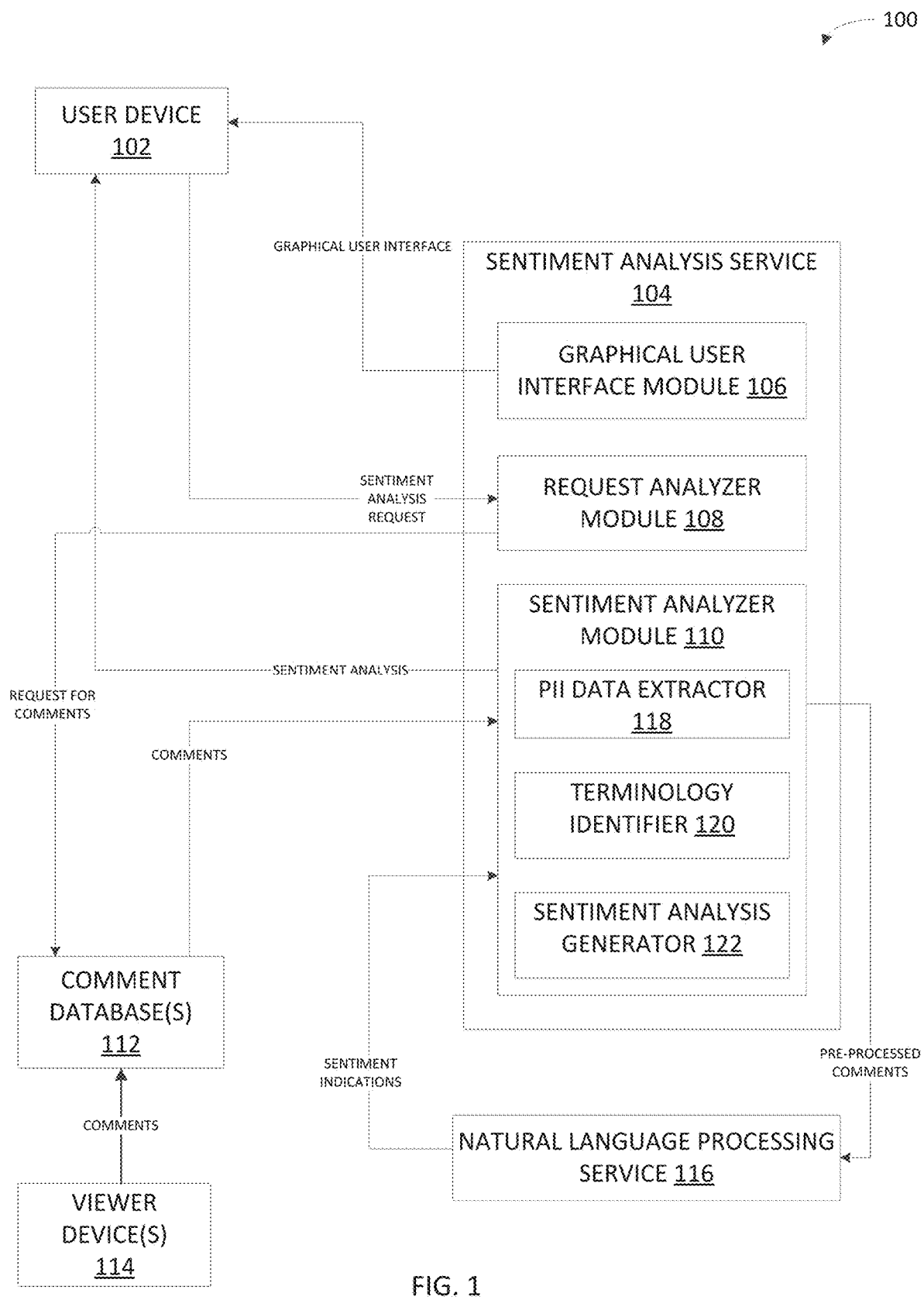
FIG. 1 depicts an example computing environment for generating a sentiment analysis of content based on comments from viewers.

Aspects of the present disclosure provide apparatuses, methods, processing systems, and computer readable mediums for generating a sentiment analysis of content from viewer comments to display in a graphical user interface of a computing device.

A sentiment analysis service can receive a request for a sentiment analysis from a user (via a user device). The user requesting the sentiment analysis of content can be the creator of the content. For example, the content creator can request a sentiment analysis of audio content in order to determine what issues need to be addressed or improved in the audio content. The user can also be associated with an organization on whose behalf the content is created. For example, an employee of an organization working in the marketing department may request a sentiment analysis of content created for the company, such as a series of videos directing viewers on how to use features of a recently launched product. By requesting the sentiment analysis, the employee of the marketing department can determine how to market the video series along with the product.

In order to generate the sentiment analysis of content, upon receiving a request from a user for a sentiment analysis of content, a sentiment analysis service retrieves a set of comments associated with the content. The sentiment analysis service pre-processes the set of comments. For example, the sentiment analysis service removes personal identifying information of a viewer from a comment. Once the sentiment analysis service pre-processes the set of comments, the sentiment analysis service sends the set of comments to a natural language processing services. In turn, the sentiment analysis service receives from the natural language processing service a set of sentiment indications corresponding to the set of comments. The sentiment analysis service then generates a sentiment analysis of the content based on the sentiment indications received from the natural language processing service. In some cases, the sentiment analysis service applies the sentiment indication to the associated comment and determines the sentiment category for the comment based on the sentiment indication. Upon generating the sentiment analysis, the sentiment analysis service displays the sentiment analysis to the user in a graphical user interface also generated by the sentiment analysis service.

In one embodiment, a sentiment analysis service receives a request from a user for a sentiment analysis of content. In some cases, the request may be for a single sentiment analysis of a single content item. In other cases, the request may be for a single sentiment analysis of multiple content items (e.g., a series of videos teaching different features of a product). The request for a sentiment analysis of content includes a corresponding content ID, which is used by the sentiment analysis service to identify a set of comments for a content item. For each comment a viewer submits for a content item, the comment is assigned the same content ID as the content item, in order to identify which comments are made in regards to a particular content item.

Upon identifying the set of comments associated with the content, the sentiment analysis service pre-processes the set of comments. In such instances, the sentiment analysis service extracts personal identifying information about a viewer from the set of comments. The sentiment analysis service sends the pre-processed set of comments to a natural language processing service, which in return provides a set of sentiment indications (e.g., sentiment scores) that correspond to the set of comments. The sentiment analysis service generates a sentiment analysis based on the sentiment indications. For example, the sentiment analysis service maps each sentiment indication to a pre-defined sentiment category (e.g., positive, negative, and neutral).

The sentiment analysis service then displays the sentiment analysis in a window of the graphical user interface, which is also generated by the sentiment analysis service. In some cases, the sentiment analysis comprises a percentage breakdown of comments associated with each sentiment categories. In other cases, the sentiment analysis also comprises a set or subset of comments associated with each sentiment category. For example, based on the request, the sentiment analysis service generates a sentiment analysis indicating out of a total number of comments associated with a content item, sixty-five percent of the comments are positive, twenty-five percent of the comments are negative, and ten percent of the comments are neutral. Further, the generated sentiment analysis can display a subset of comments associated with each sentiment category. Further still, the generated sentiment analysis can display the overall sentiment of the content.

In some cases, the sentiment analysis service can receive an additional request from the user for the contact information associated with a viewer of a comment. For example, in the displayed sentiment analysis, the user can review a subset of comments associated with each sentiment category. The user can select a particular comment from the negative sentiment category in which the viewer indicates his extreme dissatisfaction with the content. The user can request the sentiment analysis service provide contact information for the viewer associated with the selected comment. In response to receiving the request, the sentiment analysis service can retrieve the contact information of the viewer and provide the contact information to the user.

The method of generating a sentiment analysis of content from viewer comments to display in a graphical user interface allows a user to determine the overall viewer sentiment of content without having to analyze each comment individually. Further, the method of generating a sentiment analysis of content efficiently utilizes available resources such as comments from viewers and natural language processing services without overtaxing computation resources of the sentiment analysis service to generate a sentiment analysis.

Example Computing Environment for Generating a Sentiment Analysis of Content

FIG. 1 depicts an example computing environment 100 for generating a sentiment analysis of content based on comments from viewers of the content. The example computing environment 100 comprises a user device 102, a sentiment analysis service 104, comment database(s) 112, viewer device(s) 114, and natural language processing service 116.

As depicted, the sentiment analysis service 104 includes a graphical user interface module 106, a request analyzer module 108, and a sentiment analyzer module 110. The graphical user interface module 106 provides a graphical user interface to the user device 102 for receiving from a user a request for a sentiment analysis of content including audio data (e.g., live audio data or previously recorded audio data), video data (live streaming video data or previously recorded video data), documents, and other such content items developed for viewer consumption. The user device 102 includes a laptop, smartphone, tablet, or other such computing device for a user to request a sentiment analysis of content. Once the graphical user interface is provided and the user requests via the user device 102 a sentiment analysis of content, the request analyzer module 108 of the sentiment analysis service 104 receives the request.

In some cases, the request for sentiment analysis may be for a single content item. In other cases, the request for sentiment analysis may be for multiple content items. The request for sentiment analysis includes a content identifier (ID) associated with the content for which the sentiment analysis is requested. For example, the request for comments for a live video stream includes a content identifier associated with the live video stream. In another example, the request for comments for pre-recorded audio data includes a content identified associated with such pre-recorded audio data. The request analyzer module 108 identifies the content ID from the request, and based on the content ID, the request analyzer module 108 retrieves a set of comments from comment database(s) 112 matching the content ID associated with the content. In some cases, the sentiment analysis service 104 utilizes advanced AI/ML techniques to determine comments associated with content. For example, a model using the Naive Bayes algorithm can calculate the probability a comment is associated with content. The model is trained using a set of comments known to be associated with content based on the content ID. For each known comment, the model identifies a set of words within the comment related to the content and generates a probability for the set of words as being associated with the content.

In some cases, the sentiment analysis service 104 can use AI/ML techniques to determine the sentiment category of a comment based on the set of words within the comment. For example, a model is trained using a set of comments known to be associated with sentiment categories. During training, the model identifies for each comment a probability of each word in the comment as belonging to a sentiment category. For a new comment, the model determines a probability of each word belonging to a sentiment category. The probability of each word in the comment is combined, and the model determines which sentiment category is associated with the combined probability and assigns the comment to the sentiment category.

As depicted, viewer device(s) 114 provide comments regarding the content consumed by the viewer(s). The comments provided by the viewer device(s) 114 of the viewer(s) are stored in one or more comment databases 112 and assigned a content ID according to the content on which the comment is based. The view device(s) can include laptops, smartphones, tablets, and other such computing devices for a viewer to consume content and provide comment(s) regarding the content. In some cases, the comments for content can be stored from multiple sources. For example, viewers can submit comments about content through a channel established with the source or a social media platform associated with either the content or the organization responsible for the content. The request analyzer module 108 can request and retrieve a set of comments from the comment database 112 associated with the content for which sentiment analysis is requested by the user based on the content ID of the request matching comments in the comment database 112. For example, the request analyzer module 108 can retrieve a set of comments associated with a live video stream during the live video stream that has the same content ID as the live video stream.

The set of comments retrieved by the sentiment analysis service 104 are received by the sentiment analyzer module 110. The sentiment analyzer module 110 pre-processes the comments retrieved from the comment database 112 to send to the natural language processing service 116 and generates a sentiment analysis based on sentiment indications received from the natural language processing service 116. The sentiment analyzer module 110 includes a personal identifying information (PII) extractor 118, a terminology identifier 120, and a sentiment analysis generator 122.

Prior to sending the set of comments to the natural language processing service 116, the sentiment analyzer module 110 pre-processes the set of comments. In some cases, the PII extractor 118 can extract and remove any personal identifying information of a viewer from each comment in the set of comments. The PII extractor 118 can include a pattern matcher that uses common PII data formats for identifying PII, such as XXX-XX-XXXX format for a social security number, YYY-YYY-YYYY for a phone number, or A@A.com for an email address. Once the pattern matcher identifies the PII, the PII extractor 118 can extract the PII. In some cases, the PII extractor 118 can replace the PII data with anonymized data that is randomly generated. In other cases, pre-processing can further include formatting each comment in the set of comments to a single standard format. For example, extraneous spaces can be removed from a comment. Pre-processing can also include the terminology identifier 120 identifying a set of keywords in a comment. The terminology identifier 120 uses a dictionary, which includes a set of identified keywords, to determine whether any words in a comment match a keyword in the dictionary. In some cases, the terminology identifier 120 replaces any words matching to a keyword in the dictionary with a generic placeholder. Further still, the terminology identifier 120 removes pluralities and cases from words in order to reduce errors from the natural language processing service 116.

After pre-processing the set of comments, the sentiment analyzer module 110 sends the set of comments to a natural language processing service 116, which in turn provides a set of sentiment indications corresponding to each comment in the set of comments. In some cases, a sentiment indication is a sentiment score generated by the natural language processing service 116.

The sentiment analyzer module 110 receives the set of sentiment indications from the natural language processing service 116 and generates a sentiment analysis. In some cases, a sentiment analysis generator 122 of the sentiment analyzer module 110 generates the sentiment analysis by mapping the sentiment indications to pre-defined sentiment categories. For example, a sentiment indication comprises a sentiment score. Each sentiment score is assigned to a sentiment category according to the sentiment score range associated with the sentiment category. In some cases, sentiment categories include a positive sentiment, a negative sentiment, and a neutral sentiment. Once the sentiment indications are mapped to a sentiment category, the sentiment analysis generator 122 can generate a sentiment analysis, visually depicting the how many comments are assigned to the positive sentiment, negative sentiment, and neutral sentiment categories. In some cases, the sentiment analysis can include an overall sentiment, summarizing how many comments are assigned to each sentiment category. For example, the overall sentiment can include a percentage or a total count of comments assigned to each sentiment category. In other cases, the visual depiction can include one or more comments associated with the sentiment indicating in each category. After generating the sentiment analysis, the sentiment analyzer module 110 can display the sentiment analysis to the user via the user device 102 in a window of the graphical user interface.

Figure 2:
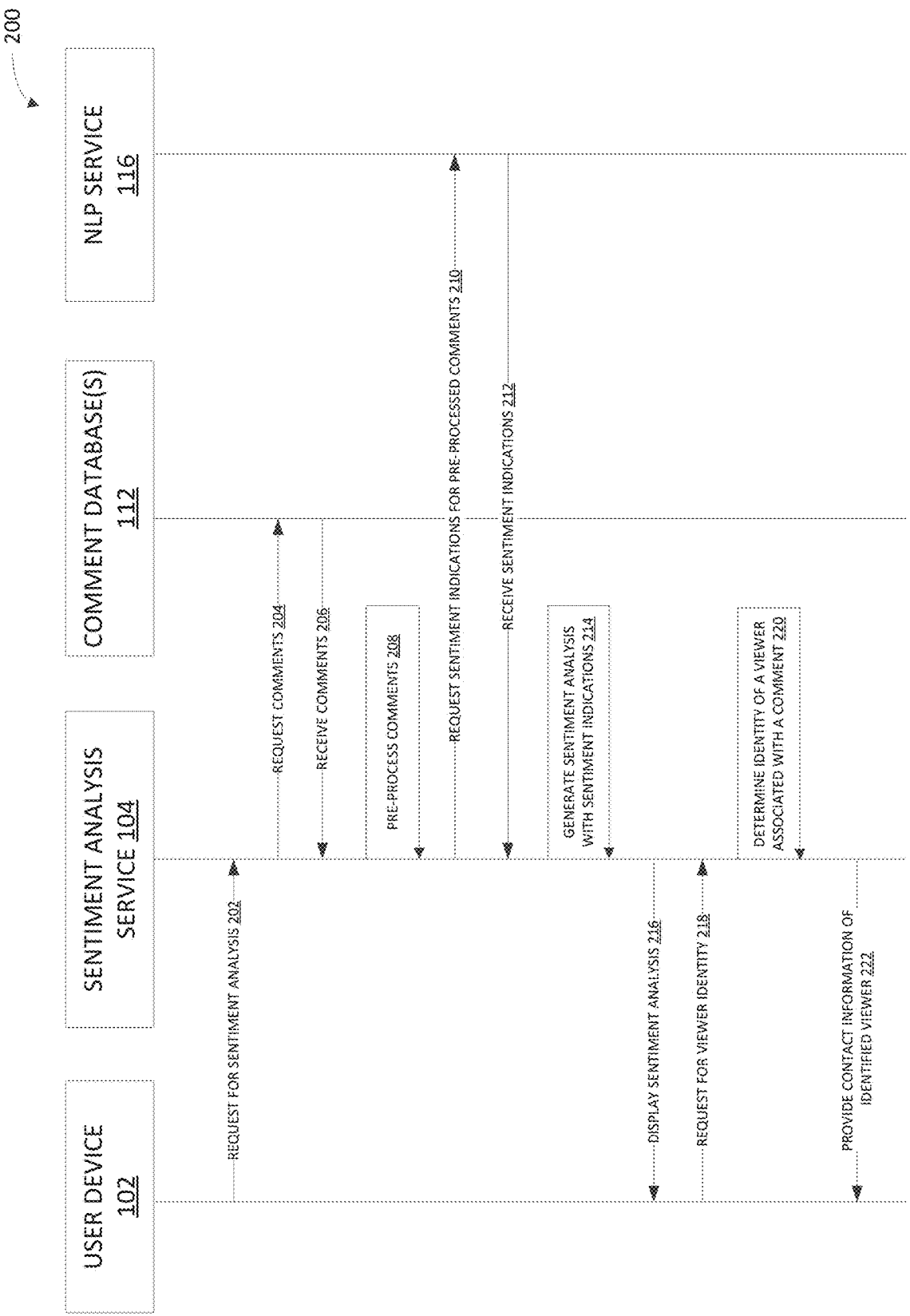
FIG. 2 depicts an example flow diagram of generating a sentiment analysis of content and identifying a viewer associated with a comment in the sentiment analysis.

Example Flow Diagram of Generating a Sentiment Analysis and Identifying a Viewer Associated with a Comment in the Sentiment Analysis FIG. 2 depicts an example flow diagram 200 of generating a sentiment analysis and identifying a viewer associated with a comment in the sentiment analysis.

The example flow diagram 200 begins with the sentiment analysis service 104 receiving 202 a request for a sentiment analysis of content from a user via a user device 102. In some cases, prior to receiving 202 the request for the sentiment analysis of content, the sentiment analysis service 104 provides a graphical user interface to a user via the user device 102. The user can use the graphical user interface of the user device 102 to submit the request for sentiment analysis.

After receiving 202 the request for sentiment analysis, the sentiment analysis service 104 identifies the content ID associated with the request for sentiment analysis. With the content ID, the sentiment analysis service 104 requests 204 and receives 206 a set of comments from viewers that is associated with the content ID. For example, when a viewer submits a comment regarding a content item consumed, the comment is stored in the comment database 112 and assigned the same content ID that is associated with the content item. After retrieving the set of comments associated with the content item, the sentiment analysis service 104 pre-processes 208 the comments. For example, the sentiment analysis service 104 extracts all PII from the set of comments in order to protect the identity of the viewer who submitted the comment.

The sentiment analysis service 104 sends the pre-processed set of comments to a natural language processing service 116 with a request 210 for sentiment indications. Following the request 210 for sentiment indications, the sentiment analysis service 104 receives 212 sentiment indications corresponding to the set of pre-processed comments. For example, the sentiment analysis service 104 can receive a set of sentiment score. Each sentiment score corresponds to a comment provided to the natural language processing service indicating the sentiment of the viewer with regard to the content consumed.

With the sentiment indications, the sentiment analysis service 104 generates 214 a sentiment analysis. For example, the sentiment analysis service 104 maps each sentiment score to a pre-defined sentiment category of positive, negative, and neutral according to the sentiment score range associated with each sentiment category. After mapping each sentiment score to the sentiment category, the sentiment analysis service 104 can visually depict the overall sentiment associated with a piece of content. In some cases, the sentiment analysis service 104 generates a sentiment analysis indicating a total number of comments associated with each sentiment category. In other cases, the sentiment analysis service 104 generates a sentiment analysis indicating a percentage of total comments associated with each sentiment category. Further, the sentiment analysis service 104 can include in the sentiment analysis a subset of comments associated with each sentiment category.

Once the sentiment analysis is generated, the sentiment analysis service 104 can display 216 the sentiment analysis via the user device 102 to the user requesting the sentiment analysis. For example, the sentiment analysis can be displayed in a new window of the graphical user interface. In some cases, the sentiment analysis can be displayed in separate panes of the window. For example, a first pane can include the positive sentiment category and a corresponding subset of comments. A second pane can include the negative sentiment category and a corresponding subset of comments. A third pane can include the neutral sentiment category and a corresponding subset of comments. Additionally, the overall sentiment of the content can be displayed in the window or as a separate pane in the window of the graphical user interface.

In some cases, the sentiment analysis service 104 can receive a request 218 from the user via the user device 102 to view the identity of the viewer associated with a comment displayed in the sentiment analysis. For example, if the user identifies via the user device 102 a sentiment indicating the viewer was extremely dissatisfied with the content, then user may want to reach out directly to the viewer to discuss how to improve the content. In order to do this, the user can submit a request via the user device 102 to the sentiment analysis service 104 for the identity of the viewer.

Upon receiving the request for viewer identity, the sentiment analysis service 104 can determine 220 the identity and contact information of a viewer from a database storing contact information of viewers. In some cases, the database storing contact information of viewers is co-located with the sentiment analysis service 104. In other cases, the database storing contact information of viewers is located remotely from the sentiment analysis service 104. After the sentiment analysis service 104 determines the identity of the viewer associated with the comment and the viewer's contact information, the sentiment analysis service 104 provides 222 the contact information of the viewer to the user device 102.

In some cases, the viewer may have previously agreed to share contact information. In such cases, the sentiment analysis service can provide the viewer's contact information to the user. In other cases, the viewer may not have agreed to provide contact information. In such cases, the sentiment analysis service can contact the viewer (e.g., via e-mail or telephone) to request sharing contact information. If the viewer agrees to share contact information, then the sentiment analysis service can provide the contact information to the user. If not, then the sentiment analysis service can provide a message to the user that the viewer's contact information is unavailable.

Example Method for Generating a Sentiment Analysis of Content

Figure 3:
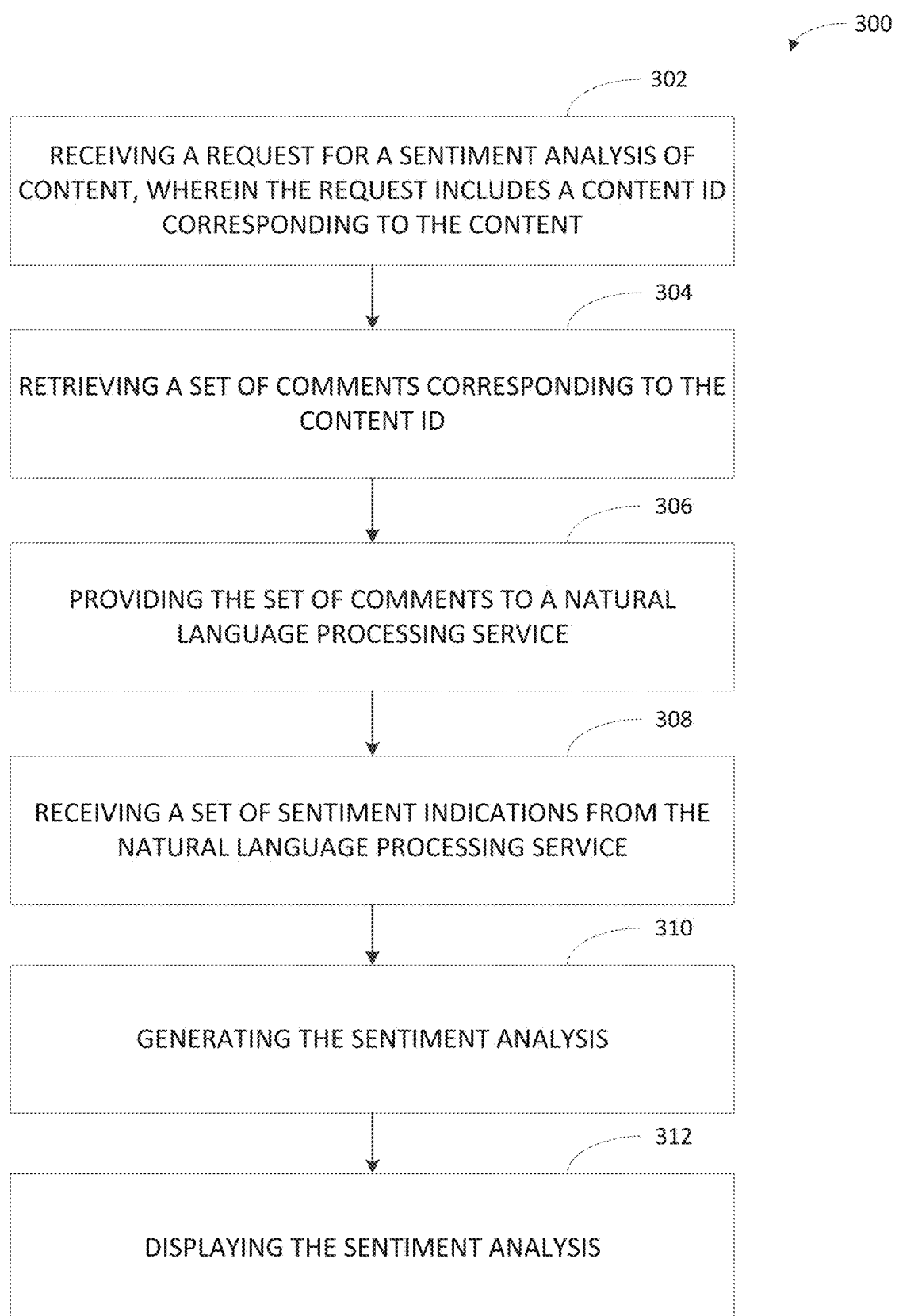
FIG. 3 depicts an example method for generating a sentiment analysis of content based on comments from viewers.

FIG. 3 depicts an example method 300 for generating a sentiment analysis of content based on comments from viewers, as described with respect to FIGS. 1-2.

At step 302, a request is received for a sentiment analysis of content. The request for the sentiment analysis can include a content ID that corresponds to the content. In some cases, the request for the sentiment analysis can be received from a user via a graphical user interface. For example, the sentiment analysis service can generate a graphical user interface in which a user can access and submit a request for sentiment analysis of content. In other cases, the request for the sentiment analysis can be for content including documents, live audio and/or video, and previously recorded audio and/or video content. In still other cases, the request for content analysis can be received from a content creator or other parties associated with the content, as described in FIG. 1.

At step 304, a set of comments is retrieved corresponding to the content ID. In some cases, upon receiving the request for sentiment analysis, the content ID corresponding to the content is identified from the request. Based on the content ID, the set of comments is retrieved. In some cases, the set of comments is retrieved from a comment database that stores the comments submitted by viewers that have consumed content, including the content for which the sentiment analysis is requested.

At step 306, the set of comments is provided to a natural language processing service. In some cases, the set of comments is pre-processed prior to sending to the natural language processing service. For example, all PII of viewers can be removed from the comments in order to protect the identity and privacy of the viewers. Further, the set of comments can be formatted to a single standard. After removing the PII from the set of comments and performing any pre-processing formatting, the set of comments are provided to a natural language processing service.

At step 308, a set of sentiment indications is received from the natural language processing service. The set of sentiment indications corresponds to set of comments provided to the natural language processing service. In some cases, the set of sentiment indications can include a sentiment score generated for each sentiment in the set of sentiments.

At step 310, a sentiment analysis is generated. In some cases, the sentiment analysis is generated by mapping each sentiment indication to a pre-defined sentiment category. Further, the sentiment analysis generated visually depicts the sentiment mapping to indicate the overall sentiment of content from viewers as well as a breakdown of illustrating the sentiment associated with each sentiment category. In some cases, the sentiment analysis is based on percentages or total count of comments associated with each sentiment category.

At step 312, the sentiment analysis is displayed in the graphical user interface. In some cases, a new window is generated to display the sentiment analysis of the content.

Figure 4:
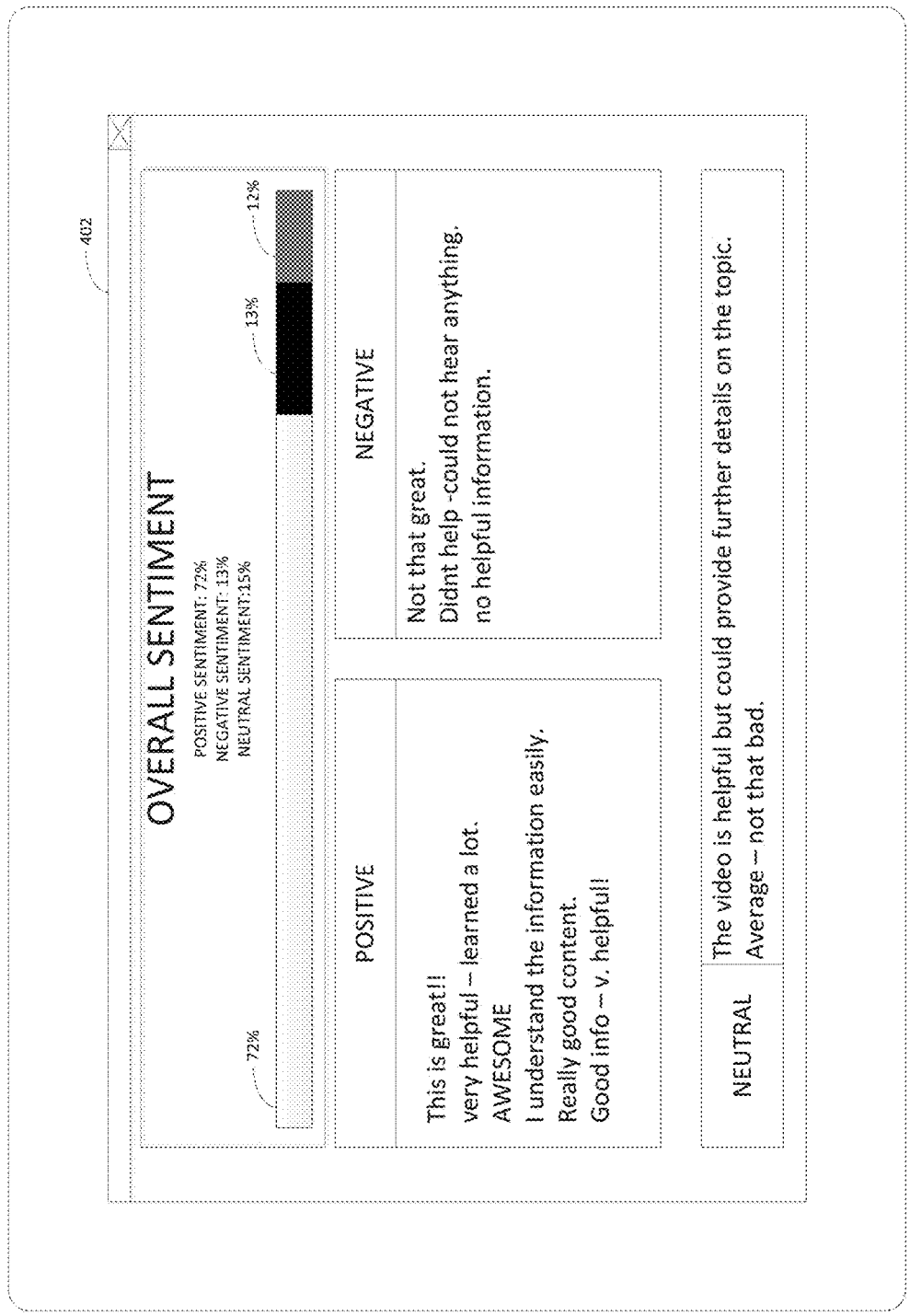
FIG. 4 depicts an example graphical user interface displaying the sentiment analysis of content based on comments from viewers.

Example Graphical User Interface Displaying the Sentiment Analysis of Content FIG. 4 depicts an example graphical user interface 400 displaying the sentiment analysis of content, as described with respect to FIGS. 1-3.

As depicted, the sentiment analysis of content is displayed in a window 402 of the example graphical user interface 400. In the window 402, the sentiment analysis of content is graphically depicted in set of panes, as described with respect to FIG. 2. Each pane of the window depicts one sentiment category and the comments associated with the sentiment category. For example, in window 402, the positive sentiment category is depicted in a pane with comments such as "This is great!!" and "very helpful—learned a lot."

Further, the overall sentiment of the content is indicated in a pane of the window 402. For example, in window 402, the percentages associated with each sentiment category is displayed as well as illustrated. As depicted, the overall sentiment of the content includes 72% of comments associated with the positive sentiment category, 13% of comments associated with the negative sentiment category, and 15% of comments associated with the neutral sentiment category.

Example Processing System for Generating a Sentiment Analysis of Content

Figure 5:
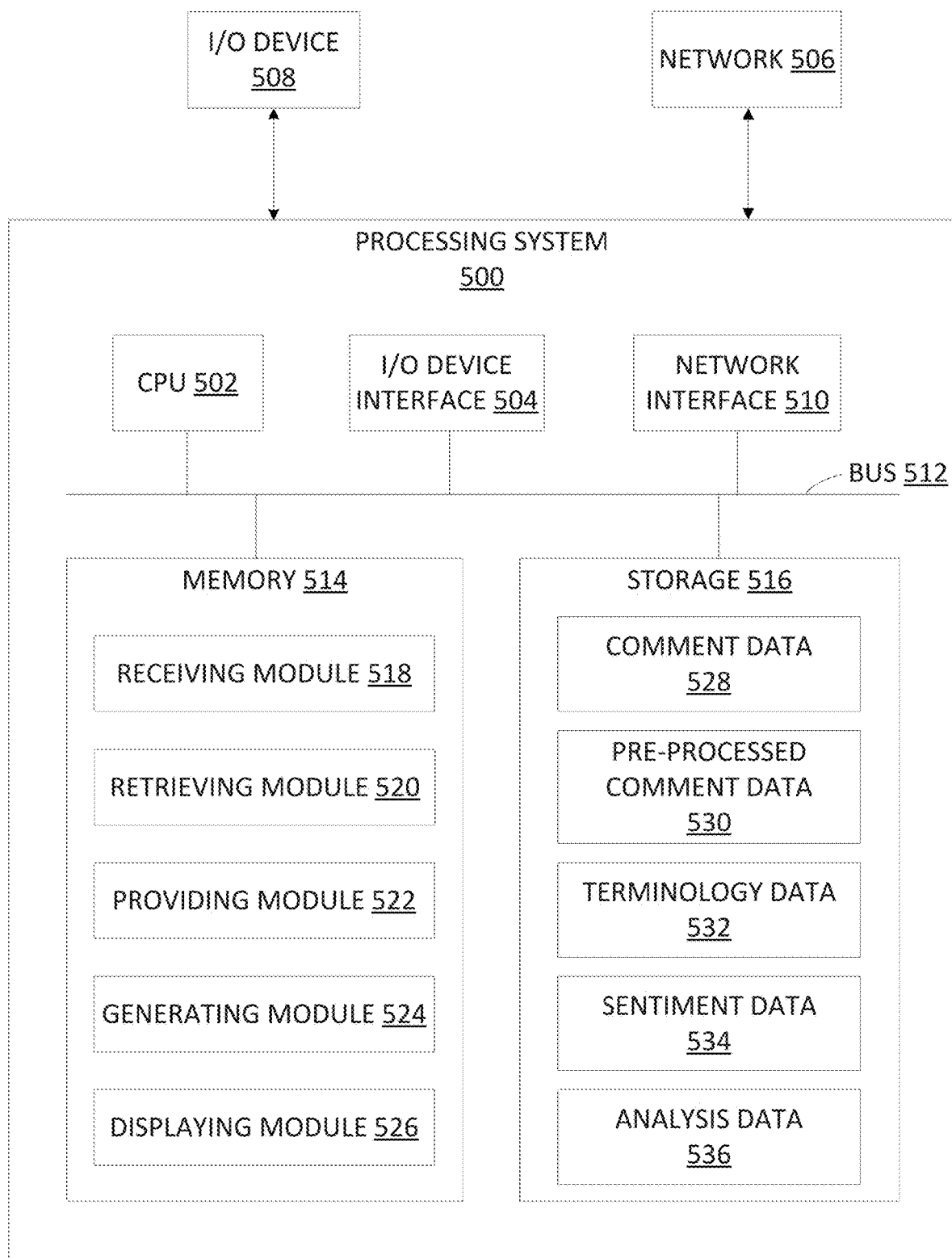
FIG. 5 depicts an example processing system for generating a sentiment analysis of content based on comments from viewers.

FIG. 5 depicts an example processing system 500 that may perform methods described herein, such as the method for generating a sentiment analysis to display in a graphical user interface described with respect to FIGS. 1-3.

Processing system 500 includes a central processing unit (CPU) 502 connected to a data bus 512. CPU 502 is configured to process computer-executable instructions, e.g., stored in memory 514 or storage 516, and to cause the processing system 500 to perform methods described herein, for example with respect to FIGS. 1-3. CPU 502 is included to be representative of a single CPU, multiple CPUs, a single CPU having multiple processing cores, and other forms of processing architecture capable of executing computer-executable instructions.

Processing system 500 further includes input/output (I/O) device(s) 508 and interface(s) 504, which allows processing system 500 to interface with input/output devices 508, such as, for example, keyboards, displays, mouse devices, pen input, and other devices that allow for interaction with processing system 500. Note that processing system 500 may connect with external I/O devices through physical and wireless connections (e.g., an external display device).

Processing system 500 further includes network interface 510, which provides processing system 500 with access to external networks 506 and thereby external computing devices.

Processing system 500 further includes memory 514, which in this example includes receiving module 518, retrieving module 520, providing module 522, generating module 524, and displaying module 526 for performing operations described in FIGS. 1-4.

Note that while shown as a single memory 514 in FIG. 5 for simplicity, the various aspects stored in memory 514 may be stored in different physical memories, but all accessible by CPU 502 via internal data connections such as bus 512.

Storage 516 further includes comment data 528, which may be like comments retrieved from a comment database, as described in FIGS. 1-3.

Storage 516 further includes pre-processed comment data 530, which may be like the set of comments processed prior to providing to a natural language service, as described in FIGS. 1-3.

Storage 516 further includes terminology data 532, which may be like the terminology data identified in the set of comments corresponding to the sentiment indications from the natural language processing service, as described in FIG. 1.

Storage 516 further includes sentiment data 534, which may include the sentiment indications received from the natural language processing service, as described in FIGS. 1-3.

Storage 516 further includes analysis data 536, which may include the sentiment analysis generated from the sentiment data 534, as described in FIGS. 1-3.

While not depicted in FIG. 5, other aspects may be included in storage 516.

As with memory 514, a single storage 516 is depicted in FIG. 5 for simplicity, but the various aspects stored in storage 516 may be stored in different physical storages, but all accessible to CPU 502 via internal data connections, such as bus 512, or external connection, such as network interface 510. One of skill in the art will appreciate that one or more elements of processing system 500 may be located remotely and accessed via a network.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing a graphical user interface to manage a sentiment analysis of content, comprising:
   receiving a request for a sentiment analysis of content, wherein the request includes a content ID corresponding to the content;
   retrieving a set of comments corresponding to the content ID;
   providing the set of comments to a natural language processing service;
   receiving, from the natural language processing service, a set of sentiment indications, wherein each respective sentiment indication of the set of sentiment indications is associated with a respective comment of the set of comments;
   generating the sentiment analysis based on the set of sentiment indications;
   displaying the sentiment analysis in a window in the graphical user interface;
   receiving, in response to displaying the sentiment analysis, a request to provide contact information regarding a viewer associated with a comment in the set of comments;
   determining whether the viewer associated with the comment agreed to provide contact information;
   displaying the contact information in response to a determination that the viewer agreed to provide the contact information; and
   displaying a message that the contact information is unavailable in response to a determination that the viewer did not agree to provide the contact information.

2. The method of claim 1, wherein the window in the graphical user interface comprises:
   a first pane displaying a comment of the set of comments with a positive sentiment category;
   a second pane displaying a comment of the set of comments with a negative sentiment category;
   a third pane displaying a comment of the set of comments with a neutral sentiment category; and
   an overall sentiment based on the set of sentiment indications.

3. The method of claim 1, further comprising removing a word in the set of comments based on matching the word to a keyword from a dictionary.

4. The method of claim 1, further comprising removing personal identifying information from the set of comments prior to providing the set of comments to the natural language processing service.

5. The method of claim 1, wherein each sentiment indication in the set of sentiment indications comprises a sentiment score that corresponds to a sentiment score range associated with:
   a positive sentiment category;
   a negative sentiment category; or
   a neutral sentiment category.

6. The method of claim 1, wherein:
   the content ID is associated with a live video stream; and
   the set of comments are received during the live video stream.

7. A non-transitory computer-readable storage medium storing instructions for performing a method of providing a graphical user interface to manage a sentiment analysis of content, comprising:
   receiving a request for a sentiment analysis of content, wherein the request includes a content ID corresponding to the content;
   retrieving a set of comments corresponding to the content ID;
   providing the set of comments to a natural language processing service;
   receiving, from the natural language processing service, a set of sentiment indications, wherein each respective sentiment indication of the set of sentiment indications is associated with a respective comment of the set of comments;
   generating the sentiment analysis based on the set of sentiment indications;
   displaying the sentiment analysis in a window in the graphical user interface;
   receiving, in response to displaying the sentiment analysis, a request to provide contact information regarding a viewer associated with a comment in the set of comments;
   determining whether the viewer associated with the comment agreed to provide contact information;
   displaying the contact information in response to a determination that the viewer agreed to provide the contact information; and
   displaying a message that the contact information is unavailable in response to a determination that the viewer did not agree to provide the contact information.

8. The non-transitory computer-readable storage medium of claim 7, wherein the window in the graphical user interface comprises:
   a first pane displaying a comment of the set of comments with a positive sentiment category;
   a second pane displaying a comment of the set of comments with a negative sentiment category;
   a third pane displaying a comment of the set of comments with a neutral sentiment category; and
   an overall sentiment based on the set of sentiment indications.

9. The non-transitory computer-readable storage medium of claim 7, the method further comprising removing a word in the set of comments based on matching the word to a keyword from a dictionary.

10. The non-transitory computer-readable storage medium of claim 7, the method further comprising removing personal identifying information from the set of comments prior to providing the set of comments to the natural language processing service.

11. The non-transitory computer-readable storage medium of claim 7, wherein each sentiment indication in the set of sentiment indications comprises a sentiment score that corresponds to a sentiment score range associated with:
   a positive sentiment category;
   a negative sentiment category; or
   a neutral sentiment category.

12. The non-transitory computer-readable storage medium of claim 7, wherein:
   the content ID is associated with a live video stream; and the set of comments are received during the live video stream.

13. A system, comprising:
a processor; and
a memory storing instructions which when executed by the processor perform a method for providing a graphical user interface to manage a sentiment analysis of content, the method comprising:
receiving a request for a sentiment analysis of content, wherein the request includes a content ID corresponding to the content;
retrieving a set of comments corresponding to the content ID;
providing the set of comments to a natural language processing service;
receiving, from the natural language processing service, a set of sentiment indications, wherein each respective sentiment indication of the set of sentiment indications is associated with a respective comment of the set of comments;
generating the sentiment analysis based on the set of sentiment indications;
displaying the sentiment analysis in a window in the graphical user interface;
receiving in response to displaying the sentiment analysis, a request to provide contact information regarding a viewer associated with a comment in the set of comments;
determining whether the viewer associated with the comment agreed to provide contact information;
displaying the contact information in response to a determination that the viewer agreed to provide the contact information; and
displaying a message that the contact information is unavailable in response to a determination that the viewer did not agree to provide the contact information.

14. The system of claim 13, wherein the window in the graphical user interface comprises:
a first pane displaying a comment of the set of comments with a positive sentiment category;
a second pane displaying a comment of the set of comments with a negative sentiment category;
a third pane displaying a comment of the set of comments with a neutral sentiment category; and
an overall sentiment based on the set of sentiment indications.

15. The system of claim 13, further comprising removing a word in the set of comments based on matching the word to a keyword from a dictionary.

16. The system of claim 13, further comprising removing personal identifying information from the set of comments prior to providing the set of comments to the natural language processing service.

17. The system of claim 13, wherein each sentiment indication in the set of sentiment indications comprises a sentiment score that corresponds to a sentiment score range associated with:
a positive sentiment category;
a negative sentiment category; or
a neutral sentiment category.

18. The method of claim 1, wherein each sentiment indication is based on a probability of each word of a respective comment in the set of comments belonging to a sentiment category.

19. The non-transitory computer-readable medium of claim 7, wherein each sentiment indication is based on a probability of each word of a respective comment in the set of comments belonging to a sentiment category.

20. The system of claim 13, wherein each sentiment indication is based on a probability of each word of a respective comment in the set of comments belonging to a sentiment category.

* * * * *